(12) United States Patent
Wang et al.

(10) Patent No.: US 11,835,767 B2
(45) Date of Patent: Dec. 5, 2023

(54) OPTICAL SUBASSEMBLY FOR BIDIRECTIONAL WDM APPLICATION

(71) Applicants: Tongqing Wang, Newark, CA (US); Ming Ding, Bellevue, WA (US)

(72) Inventors: Tongqing Wang, Newark, CA (US); Ming Ding, Bellevue, WA (US)

(73) Assignee: Alpine Optoelectronics Inc., Fremont, CA (US)

( * ) Notice: Subject to any disclaimer, the term of this patent is extended or adjusted under 35 U.S.C. 154(b) by 69 days.

(21) Appl. No.: 17/747,972

(22) Filed: May 18, 2022

(65) Prior Publication Data
US 2023/0280538 A1    Sep. 7, 2023

Related U.S. Application Data

(60) Provisional application No. 63/316,930, filed on Mar. 4, 2022.

(51) Int. Cl.
*G02B 6/293* (2006.01)
*F21V 8/00* (2006.01)

(52) U.S. Cl.
CPC ....... *G02B 6/29394* (2013.01); *G02B 6/0026* (2013.01); *G02B 6/29322* (2013.01)

(58) Field of Classification Search
CPC .............. G02B 6/0026; G02B 6/29322; G02B 6/29394

USPC ......................................................... 398/147
See application file for complete search history.

(56) References Cited

U.S. PATENT DOCUMENTS

| | | | | |
|---|---|---|---|---|
| 5,801,858 A | * | 9/1998 | Roberts ............... | H04J 14/0291 398/175 |
| 7,167,302 B2 | * | 1/2007 | Lee .................... | H01S 3/094003 359/341.32 |
| 11,323,788 B1 | * | 5/2022 | Ghuman ............. | H04J 14/0282 |
| 2002/0039212 A1 | * | 4/2002 | Lee ..................... | H04J 14/0216 398/67 |
| 2010/0316373 A1 | * | 12/2010 | Chang ................ | H04B 10/2972 398/12 |
| 2020/0119812 A1 | * | 4/2020 | Nakamura ......... | H04B 10/2589 |
| 2020/0119813 A1 | * | 4/2020 | Zhang ................. | H04B 10/505 |

* cited by examiner

*Primary Examiner* — Dalzid E Singh (57) ABSTRACT

Embodiment of present invention provide an optical subassembly that includes a first, a second, and a third band filter (BF) each having a common port (CP), a port-A (PA), and a port-B (PB). The PA of the second BF is connected to the PA of the third BF and the PB of the first BF is connected to the PB of the third BF. The optical subassembly is adapted to route a first optical signal of a blue band from the PA to the CP of the first BF; to route the first optical signal from the CP of the second BF to the CP of the third BF; to route a second optical signal of a red band from the CP of the third BF to the CP of the first BF; and to route the second optical signal from the CP to the PB of the second BF.

20 Claims, 5 Drawing Sheets

OPTICAL SUBASSEMBLY FOR BIDIRECTIONAL WDM APPLICATION

FIELD OF THE INVENTION

The present application relates generally to fiber optics, and more particularly to an optical module and related subassembly used in bidirectional WDM application.

BACKGROUND

Dense wavelength division multiplexing (DWDM) technology combines multiple optical signals of different wavelengths to transmit over a single optical fiber, which dramatically increases the efficiency of use of existing resources of fibers. Current field-installed optical fibers are mostly G.652 type fibers that have a zero chromatic dispersion wavelength around 1310 nm. However, today's DWDM technology are mainly designed for optical signals with a wavelength around 1550 nm, around which the G.652 fibers have a relatively large chromatic dispersion of around 17 ps/nm/km.

In digital optical signal transmission, chromatic dispersion of fiber causes optical pulses to spread over transmission distance. When the spread of optical pulses becomes comparable to the original width of these optical pulses, inter-symbol-interference (ISI) may occur causing errors in the detection of optical signals. As a result, transmission distance of optical signals is limited by the amount of total chromatic dispersion that the optical signals experience. Generally, the transmission distance limited by chromatic dispersion of fiber is inversely proportional to the square of optical signal data rate, and the higher the optical signal data rate the shorter the transmission distance due to the chromatic dispersion of fiber. In particular when optical signal data rate reaches 10 Gbit/sec or higher, the available transmission distance decreases dramatically. For example, when optical signal data rate reaches 100 Gbit/sec, the available transmission distance becomes only around 2 kilometers.

In a non-coherent transmission system, when optical signal data rate reaches 10 Gbit/sec or higher, in order to increase available transmission distance there is generally a need to include one or more dispersion compensation modules (DCMs) along the transmission link to compensate at least some of the chromatic dispersion of fiber. There are several types of DCMs currently available, including those based on dispersion compensating fiber and those based on fiber Bragg grating (FBG). The FBG based DCM may provide either fixed or tunable amount of chromatic dispersion compensation.

As a dispersion compensation module, FBG has the advantage of being compact, having little or no latency, and being tunable in the amount of compensation it may provide. Therefore, FBG is more preferably used in WDM transmission system. On the other hand, FBG functions unidirectionally and generally costs more to make than other DCMs such as those based on dispersion compensating fiber. Therefore, conventionally, in a single fiber bidirectional WDM transmission system, in order to incorporate FBG as a dispersion compensation module, and since FBG is unidirectional, bidirectional optical signals are usually first separated into two unidirectional groups. Each group of optical signals are then separately compensated using separate FBGs and, when necessary, amplified using separate optical fiber amplifiers.

Figure 4:
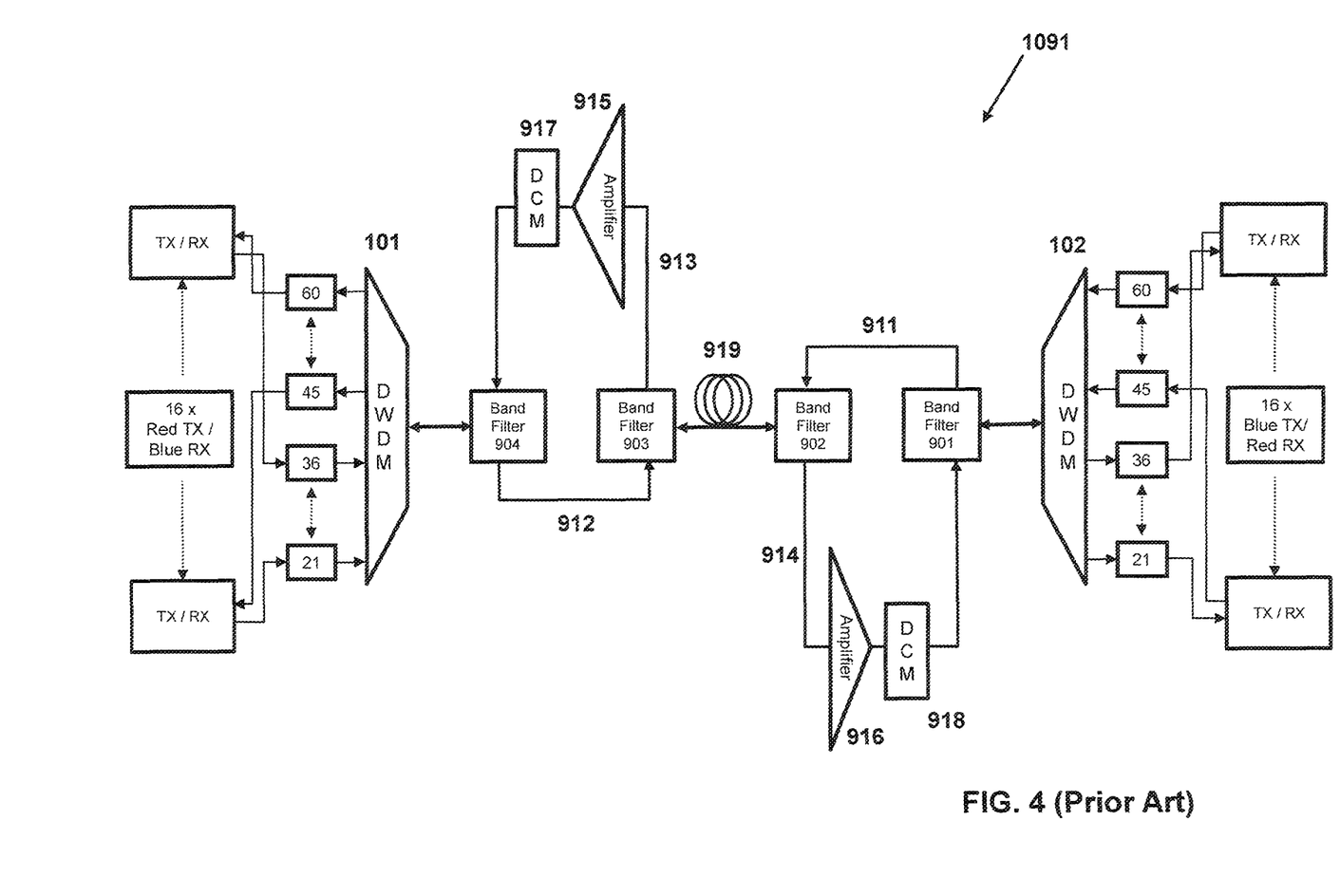
FIG. 4 is a simplified illustration of a single fiber bidirectional WDM transmission system with optical signal amplification and dispersion compensation as is known in the art.

FIG. 4 is a simplified illustration of a single fiber bidirectional WDM transmission system 1091 with optical signal amplification and dispersion compensation as is known in the art. As being illustrated, optical signals from channels 45 to 60, known as "blue" band optical signals or "blue signals" in short, may propagate from the right side to the left side, i.e., from a DWDM module 102, via an optical fiber 919, to arrive at a DWDM module 101. In the opposite direction, optical signals from channels 21 to 36, known as "red" band optical signals or "red signals" in short, may propagate from the left side to the right side, i.e., from the DWDM module 101, via the optical fiber 919, to arrive at the DWDM module 102.

As being illustrated, in order to use FBG to provide dispersion compensation to signals that propagate from the right side to the left side, the blue signals from the optical fiber 919 and the red signals from the DWDM module 101 may be made to propagate separately along a path 913 and a path 912 respectively, by using band filters 903 and 904 to divide and combine the blue signals and the red signals. More specifically, while the red signals from the DWDM module 101 may propagate along the path 912 towards the optical fiber 919, the blue signals from the optical fiber 919 may propagate along the path 913, amplified by an optical amplifier 915, and dispersion compensated by a DCM 917. The blue signals are then combined with the red signals at the band filter 904 and arrive at the DWDM module 101. Similarly, in the opposite direction, the red signals from the optical fiber 919 and the blue signals from the DWDM module 102 may be made to propagate separately along a path 914 and a path 911 respectively, by using band filters 902 and 901 to divide and combine the red signals and the blue signals. More specifically, while the blue signals from the DWDM module 102 may propagate along the path 911 towards the optical fiber 919, the red signals from the optical fiber 919 may propagate along the path 914, amplified by an optical amplifier 916, and dispersion compensated by a DCM 918. The red signals are then combined with the blue signals at the band filter 901 and arrive at the DWDM module 102. From the above it is clear that this conventional configuration of single fiber bidirectional WDM system 1091 requires the use of two FBG based DCMs 917 and 918, two optical amplifiers 915 and 916, and four band filters 901, 902, 903, and 904 in order to provide proper dispersion compensation and signal amplification.

Figure 5:
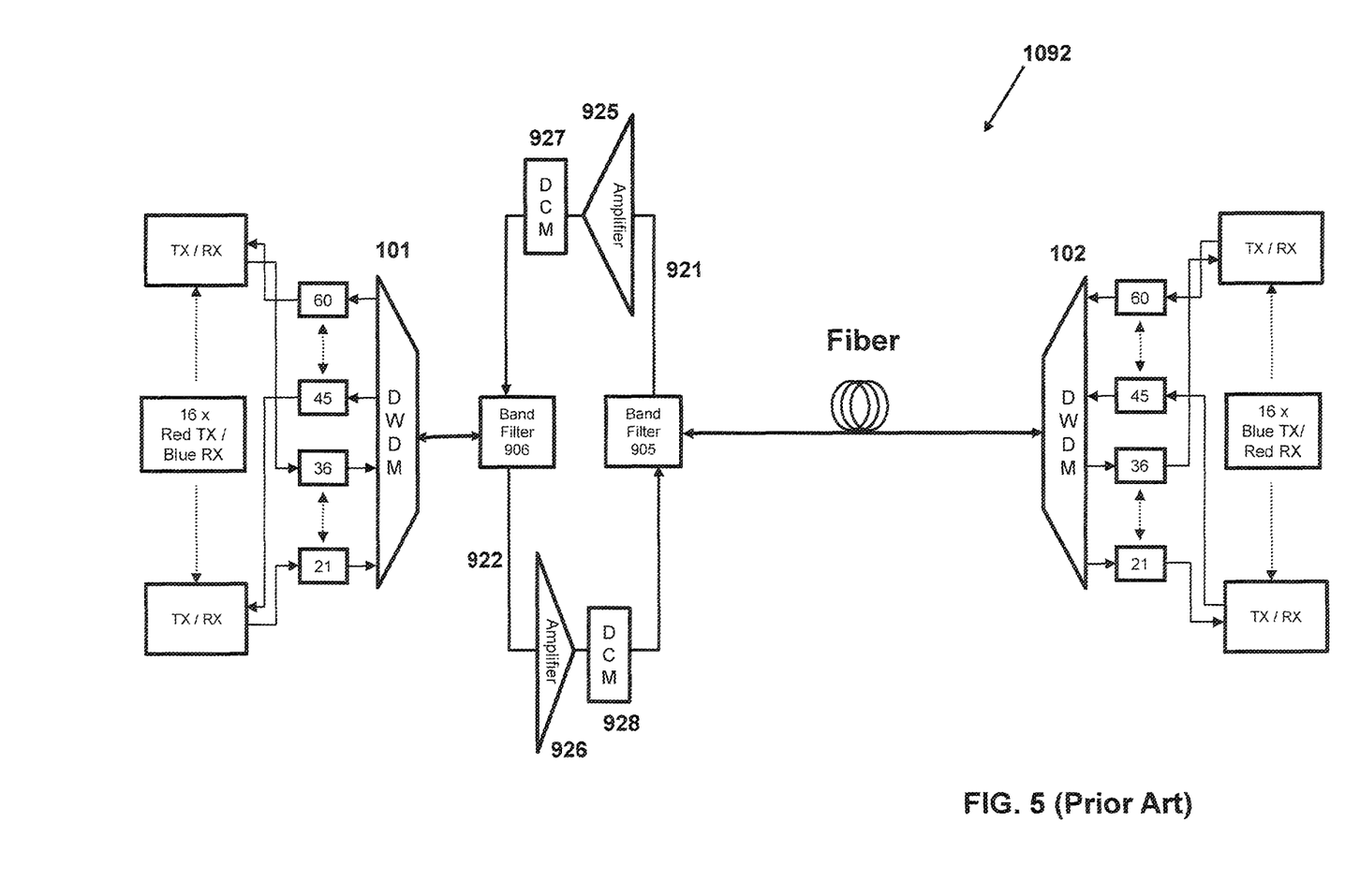
FIG. 5 is a simplified illustrations of a single fiber bidirectional WDM transmission system with optical signal amplification and dispersion compensation as is known in the art.

FIG. 5 is a simplified illustrations of a single fiber bidirectional WDM transmission system 1092 with optical signal amplification and dispersion compensation as is known in the art. In this configuration, blue signals from DWDM module 102 of channels 45 to 60 and red signals from DWDM module 101 of channels 21 to 36 are separated and/or combined at band filters 905 and 906. Blue signals are made to go through a path 921, amplified by an optical amplifier 925 and dispersion compensated by a DCM 927. In the meantime, red signals are made to go through a path 922, amplified by an optical amplifier 926 and dispersion compensated by a DCM 928. This conventional configuration of single fiber bidirectional WDM transmission system 1092 requires the same number of DCM's and the same number of optical amplifiers as the configuration of system 1091 illustrated in FIG. 4. Nevertheless, the configuration of system 1092 saves two band filters, when being compared with the configuration of system 1091, and requires only two band filters.

SUMMARY

Embodiments of present invention provide an optical subassembly. The optical subassembly include a first IO port (IOP), a module port-1 (MP1), and a module port-2 (MP2) for passing optical signals of a first band and a second band with the second band being different from the first band in wavelength; a module port-A (MPA) for passing optical signals of the first band; and a module port-B (MPB) for passing optical signals of the second band, wherein the optical subassembly is adapted to route an optical signal of the first band from the MPA to the MP1; to route the optical signal of the first band from the MP2 to the first IOP; to route an optical signal of the second band from the first IOP to the MP1; and to route the optical signal of the second band from the MP2 to the MPB.

In one embodiment, the optical subassembly includes a first band filter having a first common port (CP), a first port-A (PA), and a first port-B (PB); a second band filter having a second CP, a second PA, and a second PB; and a third band filter having a third CP, a third PA, and a third PB, wherein the MP1 is the first CP of the first band filter, the MP2 is the second CP of the second band filter; the first IOP is the third CP of the third band filter; the MPA is the first PA of the first band filter; and the MPB is the second PB of the second band filter, and wherein the second PA of the second band filter is connected to the third PA of the third band filter and the first PB of the first band filter is connected to the third PB of the third band filter.

In one embodiment, the optical subassembly may further include a fourth band filter having a fourth CP, a fourth PA, and a fourth PB, wherein the fourth PA is connected to the MPA, the fourth PB is connected to the MPB; and the fourth CP is a second IOP of the optical subassembly.

In another embodiment, the optical subassembly may further include an optical circulator having a port-1, a port-2, and a port-3 along a circulation route, wherein the port-3 of the circulator is connected to the MPA, the port-1 of the circulator is connected to the MPB; and the port-2 of the circulator is a second IOP of the optical subassembly.

In one embodiment, the optical subassembly may include a dispersion compensation module (DCM) connected between the MP1 and the MP2, and/or may include an optical fiber amplifier (OFA) connected between the MP1 and the MP2. An optical signal of the first band entering the MPA and an optical signal of the second band entering the first IOP are routed to the MP1, get compensated by the DCM and amplified by the OFA, and subsequently routed to the first IOP and the MPB respectively.

In another embodiment, the DCM is a tunable dispersion compensation module based on a fiber Bragg grating (FBG) being able to provide up to 1500 ps/nm dispersion compensation for 100 Gb/s optical PAM4 signals over both the first band and the second band.

BRIEF DESCRIPTION OF THE DRAWINGS

The present invention will be understood and appreciated more fully from the following detailed description of embodiment of the invention, taken in conjunction with accompanying drawings of which.

It will be appreciated that for simplicity and clarity purpose, elements shown in the drawings have not necessarily been drawn to scale. Further, in various functional block diagrams, two connected devices and/or elements may not necessarily be illustrated to be connected. In some other instances, grouping of certain elements in a functional block diagram may be solely for the purpose of description and may not necessarily imply that they are in a single physical entity, or they are embodied in a single physical entity.

DETAILED DESCRIPTION

In order to reduce the cost of performing dispersion compensation and optical signal amplification, particularly in a single fiber bidirectional WDM system, embodiments of present invention provide a unique optical module and an optical subassembly that converts bidirectional transmission into unidirectional transmission for the purpose of dispersion compensation and signal amplification.

Figure 1:
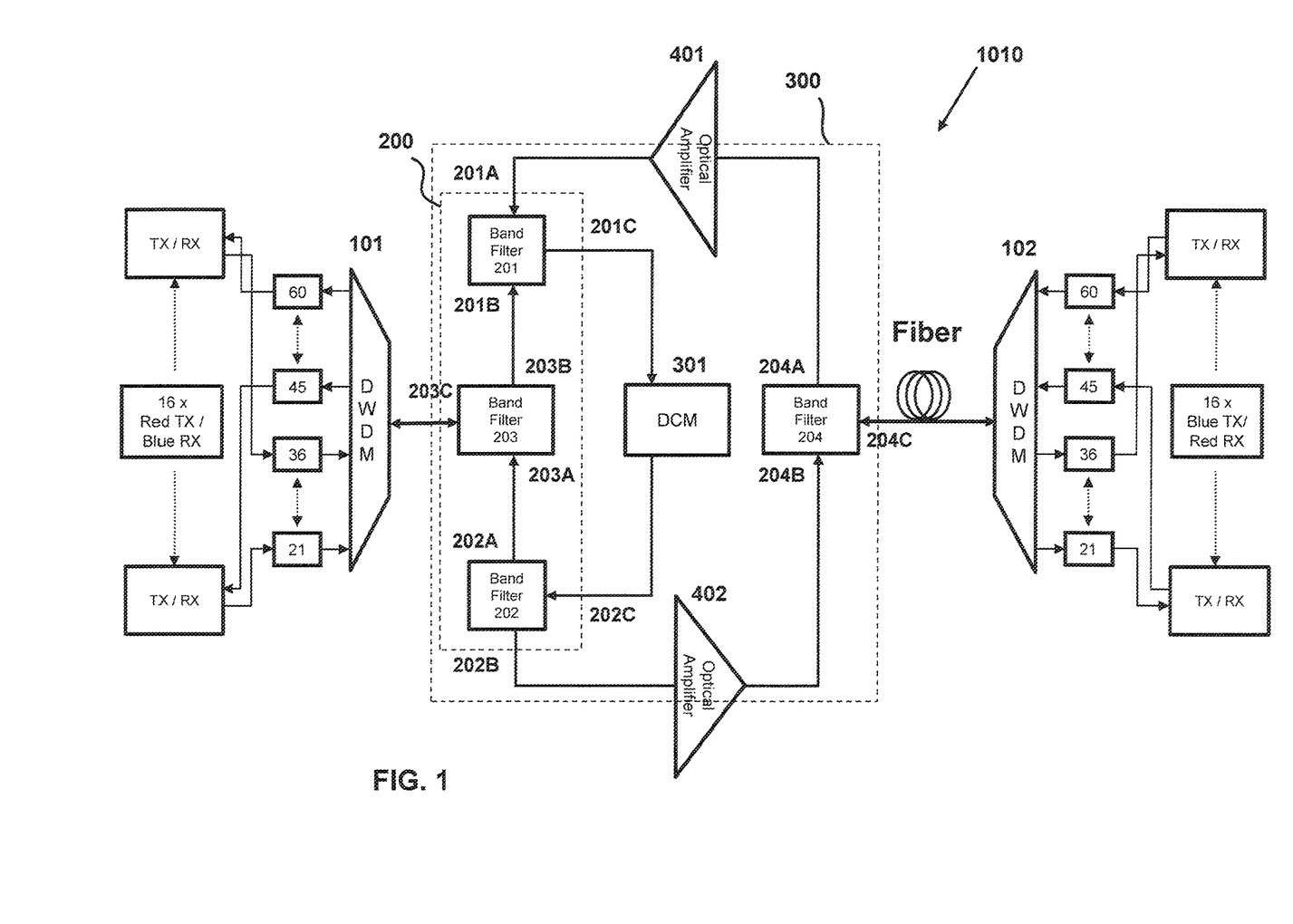
FIG. 1 is a demonstrative illustration of configuration of a single fiber bidirectional WDM transmission system with optical signal amplification and dispersion compensation according to an embodiment of present invention.

FIG. 1 is a demonstrative illustration of configuration of a single fiber bidirectional WDM transmission system 1010 with optical signal amplification and dispersion compensation according to an embodiment of present invention. More specifically, embodiments of present invention provide an optical module, as is outlined by the dashed line 200, that includes a first input/output port or 10 port (IOP) 203C, a module port-1 (MP1) 201C, and a module port-2 (MP2) 202C for passing optical signals of a first band and a second band. Optical signals of the first band are different from optical signals of the second band in wavelength. For example, the first band may be a blue band and the second band may be a red band. More particularly, optical signals of a "blue" band may have a wavelength ranging from 1529.44 nm to 1543.84 nm and optical signals of a "red" band may have a wavelength ranging from 1547.60 nm to 1561.53 nm, all in the C-band region as specified by the ITU. Optical module 200 may further include a module port-A (MPA) 201A for passing optical signals of the first band, and a module port-B (MPB) 202B for passing optical signals of the second band.

During operation, the optical module 200 may be adapted to route an optical signal of the first band, such as the blue band, from the MPA 201A to the MP1 201C and to route the optical signal of the first band from the MP2 202C to the first IOP 203C through internal ports 202A and 203A (see below). The optical module 200 may also be adapted to route an optical signal of the second band, such as the red band, from the first IOP 203C to the MP1 201C through internal ports 203B and 201B (see below) and to route the optical signal of the second band from the MP2 202C to the MPB 202B. Hereinafter, for the ease of explanation without loss of generality, the name of "blue band" may be used to refer to the first band (of optical signals) and the name "red band" may be used to refer to the second band (of optical signals) from time to time.

In one embodiment, the optical module 200 may be made of three band filters 201, 202, and 203 that are cascaded together. The three band filters 201, 202, and 203 may function to filter optical signals of the first band, such as the blue band from optical signals of the second band such as the red band. More specifically, the three band filters 201, 202, and 203 may each include a common port (CP) 201C, 202C, and 203C where optical signals of both the first band and the second band may propagate and pass, a port-A (PA) 201A, 202A, and 203A where only optical signals of the first band may propagate and pass, and a port-B (PB) 201B, 202B, and 203B where only optical signals of the second band may propagate and pass.

In one embodiment, the CP of the first band filter 201 is (and works as) the MP1 201C; the CP of the second band filter 202 is (and works as) the MP2 202C; and the CP of the third band filter 203 is (and works as) the first IOP 203C of the optical module 200. The PA of the first band filter 201 is (and works as) the MPA 201A; and the PB of the second band filter 202 is (and works as) the MPB 202B of the optical module 200. Internal to optical module 200, the PA 202A of the second band filter 202 may be connected to the PA 203A of the third band filter 203 and the PB 203B of the third band filter 203 may be connected to the PB 201B of the first band filter 201.

Embodiments of present invention further provide an optical subassembly 300 that includes optical module 200 and a fourth band filter 204. More specifically, optical subassembly 300 may include a first IOP 203C which is also the first IOP 203C of the optical module 200, and a second IOP 204C which is also a CP of the fourth band filter 204. In other words, the first IOP of the optical subassembly 300 and the first IOP of the optical module 200 share a same port, and the second IOP of the optical subassembly 300 and the CP of the fourth band filter 204 share a same port as well. A PA 204A of the fourth band filter 204 may be connected to the MPA 201A of the optical module 200, and a PB 204B of the fourth band filter 204 may be connected to the MPB 202B of the optical module 200.

During operation, optical signals of the first band coming from the fiber may enter the optical subassembly 300 through the second IOP 204C; exit the fourth band filter 204 through the PA 204A; propagate toward the optical module 200; and enter the optical module 200 through the MPA 201A for further routing and processing as being described above. Optical signals of the second band coming from the MPB 202B of the optical module 200 may enter the fourth band filter 204 through the PB 204B and exit the optical subassembly 300 via the second IOP 204C to propagate along the fiber.

According to one embodiment, a dispersion compensation module (DCM) 301 may be placed and connected between the MP1 201C and the MP2 202C. The DCM 301 may be a fiber Bragg grating (FBG) based dispersion compensation module and may be able to provide tunable dispersion compensation to both the first and the second band of optical signals such as the blue band and the red band optical signal, both of which propagate in the same direction from MP1 201C to MP2 202C. However, embodiments of present invention are not limited in this aspect and other types of DCMs such as a dispersion compensating fiber-based DCM, ring-based DCM, or Etalon-based DCM may be used as well. Optical signals of both the first band and the second band coming from the optical module 200, via the MP1 201C, may enter the DCM 301, receive dispersion compensation, and enter the optical module 200, via the MP2 202C, for further routing and processing.

In one embodiment, a first optical fiber amplifier 401, such as an erbium-doped fiber amplifier (EDFA), may be connected between the PA 204A of the fourth band filter 204 and the MPA 201A of the optical module 200 to amplify optical signals of the first band. In another embodiment, a second optical fiber amplifier 402 may be connected between the MPB 202B of the optical module 200 and the PB 204B of the fourth band filter 204 to amplify optical signals of the second band. In yet another embodiment, a third optical fiber amplifier 403 may be connected between the MP1 201C and the MP2 202C, either before or after the DCM 301, to amplify both the first band and the second band of optical signals, as being demonstratively illustrated in FIG. 3.

Figure 2:
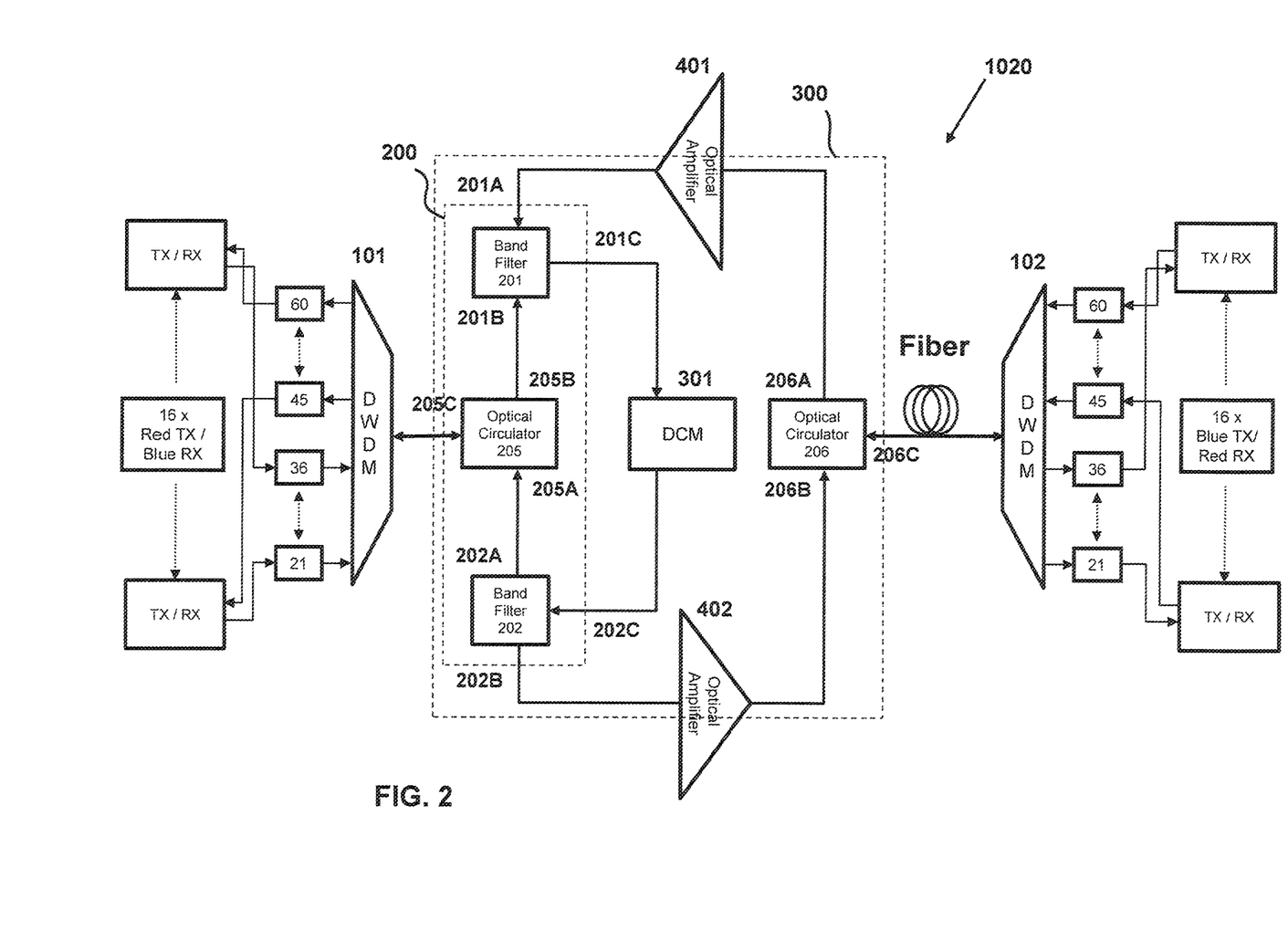
FIG. 2 is a demonstrative illustration of configuration of a single fiber bidirectional WDM transmission system with optical signal amplification and dispersion compensation according to another embodiment of present invention.

FIG. 2 is a demonstrative illustration of configuration of a single fiber bidirectional WDM transmission system 1020 with optical signal amplification and dispersion compensation according to other embodiments of present invention. More specifically, embodiments of present invention may include situations where, as being compared with configuration of system 1010 illustrated in FIG. 1, either the third band filter 203 and/or the fourth band filter 204 may be replaced by an optical circulator. As an example, as being specifically illustrated in FIG. 2, the third band filter 203 may be replaced with a first optical circulator 205 and the fourth band filter 204 may be replaced with a second optical circulator 206. The first optical circulator 205 may be a three-port (or more) optical circulator whose first port 205A is connected to the PA 202A of the second band filter 202, whose second port 205C is (and works as) a first IOP 205C of the optical module 200 or the optical subassembly 300, and whose third port 205B is connected to the PB 201B of the first band filter 201. The second optical circulator 206 may be a three-port (or more) optical circulator as well whose first port 206B is connected to the MPB 202B of the optical module 200, whose second port 206C is (and works as) a second IOP 206C of the optical subassembly 300, and whose third port 206A is connected to the MPA 201A of the optical module 200.

During operation, optical signals of the first band may enter the first port 205A and exit the optical module 200 at the first IOP 205C. Optical signals of the second band may enter the optical module 200 at the first IOP 205C, exit the third port 205B of the first optical circulator 205 to propagate to the first band filter 201; and enter the PB 201B of the first band filter 201. Similarly, optical signals of the first band coming from the fiber may enter the optical subassembly 300 at the second IOP 206C; exit the third port 206A of the second optical circulator 206 to propagate to the optical module 200; and enter the MPA 201A of the optical module 200. Optical signals of the second band coming from the MPB 202B of the optical module 200 may enter the first port 206B of the second optical circulator 206; and exit the second IOP 206C of the optical subassembly 300 to propagate along the fiber.

Figure 3:
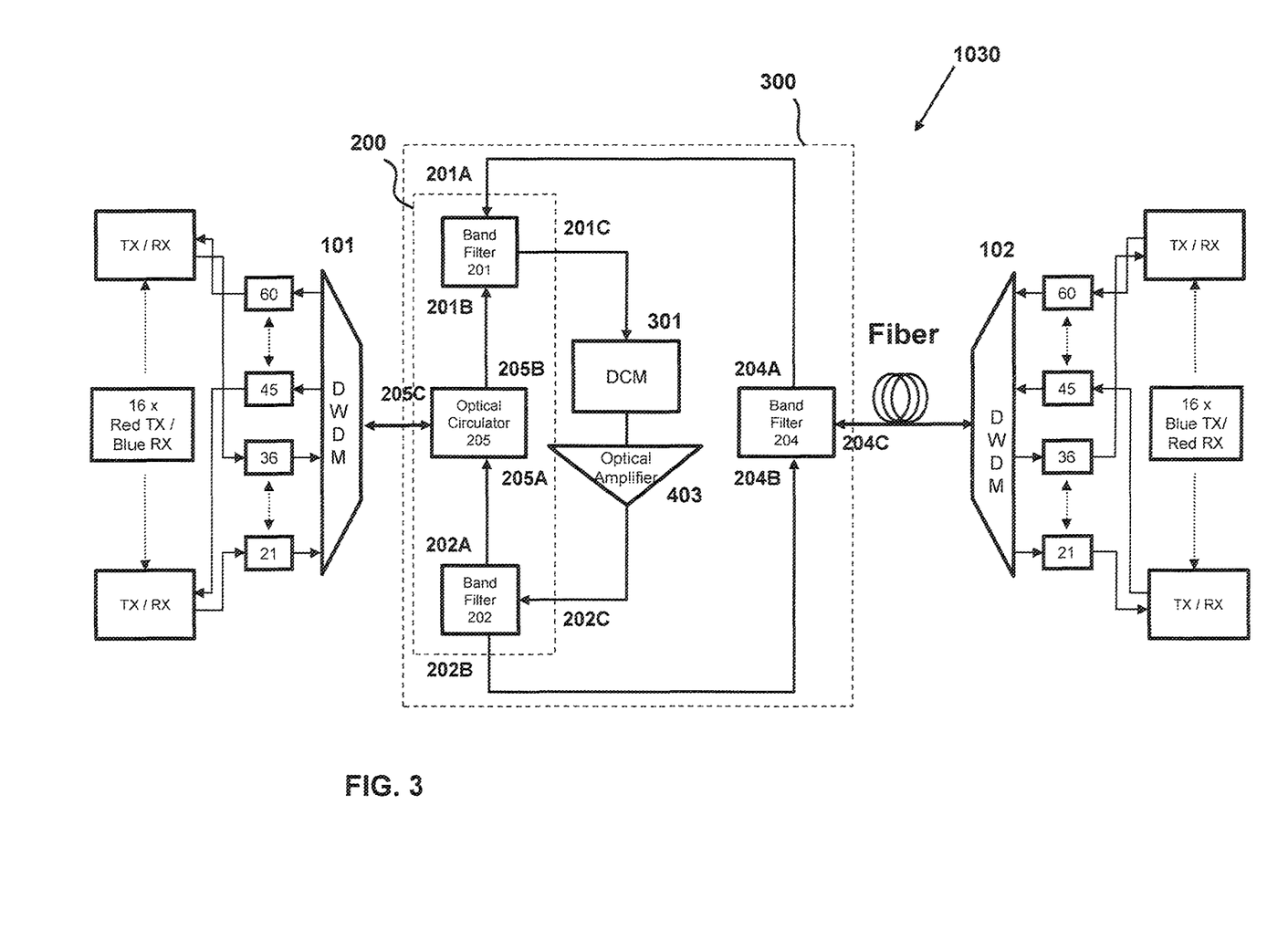
FIG. 3 is a demonstrative illustration of configuration of a single fiber bidirectional WDM transmission system with optical signal amplification and dispersion compensation according to yet another embodiment of present invention.

FIG. 3 is a demonstrative illustration of configuration of a single fiber bidirectional WDM transmission system 1030 with optical signal amplification and dispersion compensation according to yet another embodiment of present invention. Here, as an illustration that either one or both of the third and fourth band filters 203 and 204 (see FIG. 1) may be replaced with one or two optical circulators, FIG. 3 illustrates that the third band filter 203 is replaced by a first optical circulator 205. Moreover, FIG. 3 illustrates that, instead of placing the first optical fiber amplifier 401 between the first band filter 201 and the fourth band filter 204 and placing the second optical fiber amplifier 402 between the second band filter 202 and the fourth band filter 204, embodiment of present invention provides placing a third optical fiber amplifier 403 between the MP1 201C and the MP2 202C of the optical module 200, together with a DCM 301. The third optical fiber amplifier 403 may be placed before, or after, the DCM 301 and may be preferably placed after the DCM 301.

It should be noted that the DCM used herein is exemplary. Any suitable type of DCM, such as, for example, ring-based DCM, Etalon-based DCM, etc. may be utilized with the optical subassembly disclosed herein above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An optical subassembly comprising:
   a first IO port (IOP), a module port-1 (MP1), and a module port-2 (MP2) for passing optical signals of a first band and a second band with the second band being different from the first band in wavelength;
   a module port-A (MPA) for passing optical signals of the first band; and
   a module port-B (MPB) for passing optical signals of the second band,
   wherein the optical subassembly is adapted to route an optical signal of the first band from the MPA to the MP1; to route the optical signal of the first band from the MP2 to the first IOP; to route an optical signal of the second band from the first IOP to the MP1; and to route the optical signal of the second band from the MP2 to the MPB.

2. The optical subassembly of claim 1, comprising a first band filter having a first common port (CP), a first port-A (PA), and a first port-B (PB); a second band filter having a second CP, a second PA, and a second PB; and a third band filter having a third CP, a third PA, and a third PB, wherein the MP1 is the first CP of the first band filter; the MP2 is the second CP of the second band filter; the first IOP is the third CP of the third band filter; the MPA is the first PA of the first band filter; and the MPB is the second PB of the second band filter, and wherein the second PA of the second band filter is connected to the third PA of the third band filter and the first PB of the first band filter is connected to the third PB of the third band filter.

3. The optical subassembly of claim 2, further comprising a fourth band filter having a fourth CP, a fourth PA, and a fourth PB, wherein the fourth PA is connected to the MPA, the fourth PB is connected to the MPB; and the fourth CP is a second IOP of the optical subassembly.

4. The optical subassembly of claim 2, further comprising a circulator having a port-1, a port-2, and a port-3 along a circulation route, wherein the port-3 of the circulator is connected to the MPA, the port-1 of the circulator is connected to the MPB; and the port-2 of the circulator is a second IOP of the optical subassembly.

5. The optical subassembly of claim 2, further comprising a dispersion compensation module (DCM) connected between the MP1 and the MP2.

6. The optical subassembly of claim 5, wherein the DCM is a tunable dispersion compensation module based on a fiber Bragg grating (FBG) being able to provide up to 1500 ps/nm optical signal dispersion compensation for 100 Gb/s PAM4 signals over both the first band and the second band.

7. The optical subassembly of claim 5, further comprising an optical fiber amplifier (OFA) connected between the MP1 and the MP2.

8. The optical subassembly of claim 7, wherein an optical signal of the first band entering the MPA and an optical signal of the second band entering the first IOP are routed to the MP1, get compensated by the DCM and amplified by the OFA, and subsequently routed to the first IOP and the MPB respectively.

9. The optical subassembly of claim 1, comprising a first band filter having a first common port (CP), a first port-A (PA), and a first port-B (PB); a second band filter having a second CP, a second PA, and a second PB; and a first circulator having a port-1, a port-2, and a port-3 along a circulation route, wherein the MP1 is the first CP of the first band filter; the MP2 is a second CP of the second band filter; and first IOP is the port-2 of the first circulator; the MPA is the first PA of the first band filter; and the MPB is the second PB of the second band filter, and wherein the second PA of the second band filter is connected to the port-1 of the first circulator and the first PB of the first band filter is connected to the port-3 of the first circulator.

10. The optical subassembly of claim 9, further comprising a second circulator having a port-1, a port-2, and a port-3 along a circulation route, wherein the port-3 of the second circulator is connected to the MPA, the port-1 of the second circulator is connected to the MPB; and the port-2 of the second circulator is a second IOP of the optical subassembly.

11. The optical module of claim 9, further comprising a third band filter having a third CP, a third PA, and a third PB, wherein the third PA of the third band filter is connected to the MPA, the third PB of the third band filter is connected to the MPB; and the third CP is a second IOP of the optical subassembly.

12. An optical subassembly comprising:
    a first band filter having a first common port (CP), a first port-A (PA), and a first port-B (PB); a second band filter having a second CP, a second PA, and a second PB; and a first IO module having a port-1, a port-2, and a port-3, wherein the second PA of the second band filter is connected to the port-1 of the first IO module and the first PB of the first band filter is connected to the port-3 of the first IO module,
    wherein the optical subassembly is adapted to route an optical signal of a blue band from the first PA to the first CP of the first band filter; to route the optical signal of the blue band from the second CP of the second band filter to the port-2 of the first IO module; to route an optical signal of a red band from the port-2 of the first IO module to the first CP of the first band filter; and to route the optical signal of the red band from the second CP to the second PB of the second band filter.

13. The optical subassembly of claim 12, wherein the first IO module is a third band filter having a third CP, a third PA, and a third PB, and wherein the port-1 of the first IO module is the third PA of the third band filter; the port-2 of the first IO module is the third CP of the third band filter, and the port-3 of the first IO module is the third PB of the third band filter.

14. The optical subassembly of claim 12, further comprising a fourth band filter having a fourth CP, a fourth PA, and a fourth PB, wherein the fourth PA of the fourth band filter is connected to the first PA of the first band filter, and the fourth PB of the fourth band filter is connected to the second PB of the second band filter.

15. The optical subassembly of claim 12, further comprising a dispersion compensation module (DCM) connected between the first CP of the first band filter and the second CP of the second band filter.

16. The optical subassembly of claim 15, wherein the DCM is a tunable dispersion compensation module based on a fiber Bragg grating (FBG) being able to provide up to 1500 ps/nm optical signal compensation over both the blue band and the red band.

17. The optical subassembly of claim 15, further comprising an optical fiber amplifier (OFA) connected between the DCM and the second CP of the second band filter.

18. The optical subassembly of claim 12, wherein the first IO module is an optical circulator having the port-1, the port-2, and the port-3 along a circulation route.

19. An optical subassembly comprising:
a first band filter having a first common port (CP), a first port-A (PA), and a first port-B (PB); a second band filter having a second CP, a second PA, and a second PB; and a third band filter having a third CP, a third PA, and a third PB, wherein the second PA of the second band filter is connected to the third PA of the third band filter and the first PB of the first band filter is connected to the third PB of the third band filter,
wherein the optical subassembly is adapted to route an optical signal of a blue band from the first PA to the first CP of the first band filter; to route the optical signal of the blue band from the second CP of the second band filter to the third CP of the third band filter; to route an optical signal of a red band from the third CP of the third band filter to the first CP of the first band filter; and to route the optical signal of the red band from the second CP to the second PB of the second band filter, and
wherein a dispersion compensation module (DCM) and an optical fiber amplifier (OFA) are connected between the first CP of the first band filter and the second CP of the second band filter.

20. The optical subassembly of claim 19, further comprising a fourth band filter having a fourth CP, a fourth PA, and fourth PB, wherein the fourth PA of the fourth band filter is connected to the first PA of the first band filter, and the fourth PB of the fourth band filter is connected to the second PB of the second band filter, and
wherein an optical signal of the blue band entering the fourth CP of the fourth band filter propagates to the first PA of the first band filter, to the DCM and the OFA, to the second PA of the second band filter, and exits the optical subassembly at the third CP of the third band filter, and
wherein an optical signal of the red band entering the third CP of the third band filter propagates to the first PB of the first band filter, to the DCM and the OFA, to the second PB of the second band filter, and exits the optical subassembly at the fourth CP of the fourth band filter.

* * * * *